(12) United States Patent
Shelton

(10) Patent No.: US 7,437,923 B2
(45) Date of Patent: Oct. 21, 2008

(54) WIND AND WATER SPEED AND DIRECTION MEASUREMENT DEVICE

(75) Inventor: Christopher Shelton, London (GB)

(73) Assignee: Autonnic Research Limited, Tollesbury, Essex (GB)

( * ) Notice: Subject to any disclaimer, the term of this patent is extended or adjusted under 35 U.S.C. 154(b) by 32 days.

(21) Appl. No.: 11/803,293

(22) Filed: May 14, 2007

(65) Prior Publication Data

US 2008/0066539 A1 Mar. 20, 2008

(51) Int. Cl.
*G01P 13/00* (2006.01)
(52) U.S. Cl. .................... 73/170.01; 73/170.16
(58) Field of Classification Search ........... 73/170.01, 73/170.016

See application file for complete search history.

(56) References Cited

U.S. PATENT DOCUMENTS 6,279,393 B1 * 8/2001 McLaughlin ............. 73/170.14
2007/0234790 A1 * 10/2007 Fan .......................... 73/170.01

\* cited by examiner

*Primary Examiner*—Andre J Allen
(74) *Attorney, Agent, or Firm*—J. Wiley Horton

(57) ABSTRACT

A device for measuring fluid flow, in particular, but not exclusively, wind and/or water speed and direction. The device includes magnetic measuring means having a core and first and second orthogonal windings arranged over the core, and deflector means adapted to be deflected in use by a fluid flow, the deflector means comprising a deflectable element resiliently connected to further magnetic field means, the deflector means being deflectably mounted with respect to the magnetic measurement means, which provides an output, the magnitude of which output corresponds to the magnitude of deflection of the deflector means, wherein the output is resolvable in two orthogonal axes such that a value for fluid flow direction can be determined.

56 Claims, 4 Drawing Sheets

WIND AND WATER SPEED AND DIRECTION MEASUREMENT DEVICE

CROSS REFERENCES TO RELATED APPLICATIONS

Figure 1:
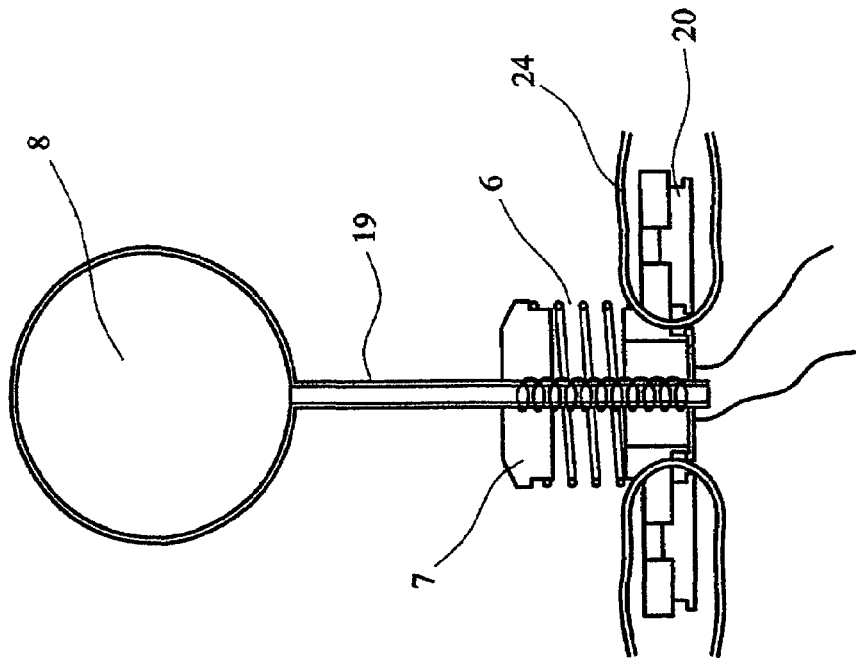

This application is a U.S. National Stage application filed pursuant to 35 U.S.C. §371. Pursuant to the cited section and the Patent Cooperation Treaty, priority is claimed to International Application No. PCT/GB2005/004380 having a priority date of 15 Nov. 2004.

STATEMENT REGARDING FEDERALLY SPONSORED RESEARCH OR DEVELOPMENT

Not applicable.

MICROFICHE APPENDIX

Not applicable.

The invention relates to a device for measuring fluid flow, in particular, but not exclusively, wind and/or water speed and direction.

In sailing and other activities, such as hydrography, it is often necessary to know the wind speed and direction and also water speed and direction, particularly for the purposes of navigation in sailing. It is now common to use satellite based GPS navigation systems, which can accurately determine a boat's position to within a few metres but such navigation systems cannot say which direction North is. Hydrography has also developed and modern hydrography requires accurate measurement of tides and current to precision at less than the level of a metre. Differential GPS is currently favoured but basic GPS is limited to an accuracy of around 100 metres for civilian purposes. A typical differential GPS is accurate to a few metres and again cannot say what direction North is.

The present invention therefore seeks to provide a device for measuring fluid flow and direction such as wind and/or water speed and direction.

According to the invention, there is provided a device for measuring fluid flow and direction comprising magnetic measurement means having a core and first and second orthogonal windings arranged over the core, and deflector means adapted to be deflected in use by a fluid flow, the deflector means comprising a deflectable element resiliently connected to ether magnetic field means, the deflector means being deflectably mounted with respect to the magnetic measurements means, which provides an output, the magnitude of which output corresponds to the magnitude of deflection of the deflector means, wherein the output is resolvable in two orthogonal axes such that a value for fluid flow direction can be determined.

Preferably, the further magnetic field means comprises at least one of a permanent magnetic or a third winding or an electromagnet, the axis of each of which is orthogonal to the first and second windings when the deflectable element is in an undeflected position. Preferably, in use, an alternating current is supplied to the third winding so that an alternating magnetic field is established in the magnetic measurement means, such that a deflection of the deflector means induces voltages in the first and second windings, the magnitude and phase of the voltage providing a measure of fluid flow and direction.

Preferably, the magnetic measurement means comprises a ring fluxgate magnetometer. Preferably the deflection means is supported on a spring, which spring is resiliently mounted on the magnetic core. Preferably, the deflection means comprises a spheroidal element, in particular a sphere, adapted to be deflected by fluid flow, the spheroidal element being provided with a connecting rod, which rod supports the second winding. Preferably, the connecting rod is resiliently held in a mount, which mount is rigidly connected to the spring. Preferably, the deflector means comprises a rod of a ferromagnetic material and the further magnetic means comprises a third winding, which third winding is position fixed with respect to the first and second windings, wherein, in use, a steady current is applied to the third winding, which current induces a magnetic field in the rod.

The concept underlying invention is the means by which a fluid flow causes a deflection and this can be detected in both strength and direction by magnetic means. The fluid flow causes a drag force on the deflector means, which spheroidal shape so that the drag-force is the same whichever the direction of the fluid motion. The deflector or drag shape means is attached to an assembly such as a rod which is suspended resiliently, for example with a coil spring, so as to cause a deflection as a result of the drag-force. The deflection of the assembly is then measured with magnetic means, the output of which gives a value of the amount of the deflection by which measure the original fluid speed can be determined in two orthogonal axes so that by resolving the magnitude of the deflection in each axis a value for the direction of the fluid flow can be determined.

Such magnetic measurement means can be either by alternating field means such as by transformer action or by the use of constant field means such as by fluxgate action.

Figure 2:
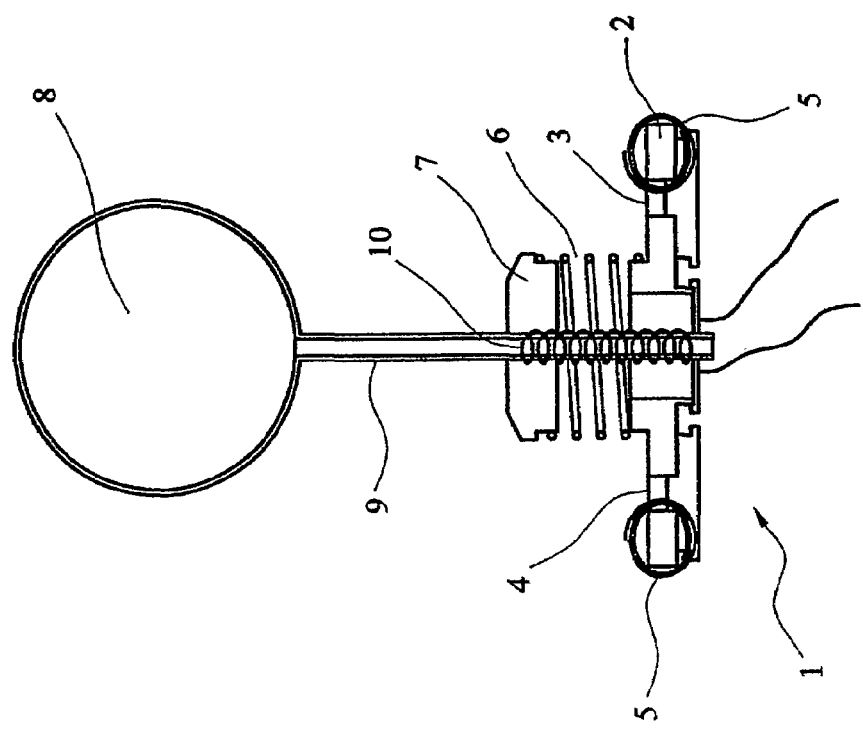
Figure 3:
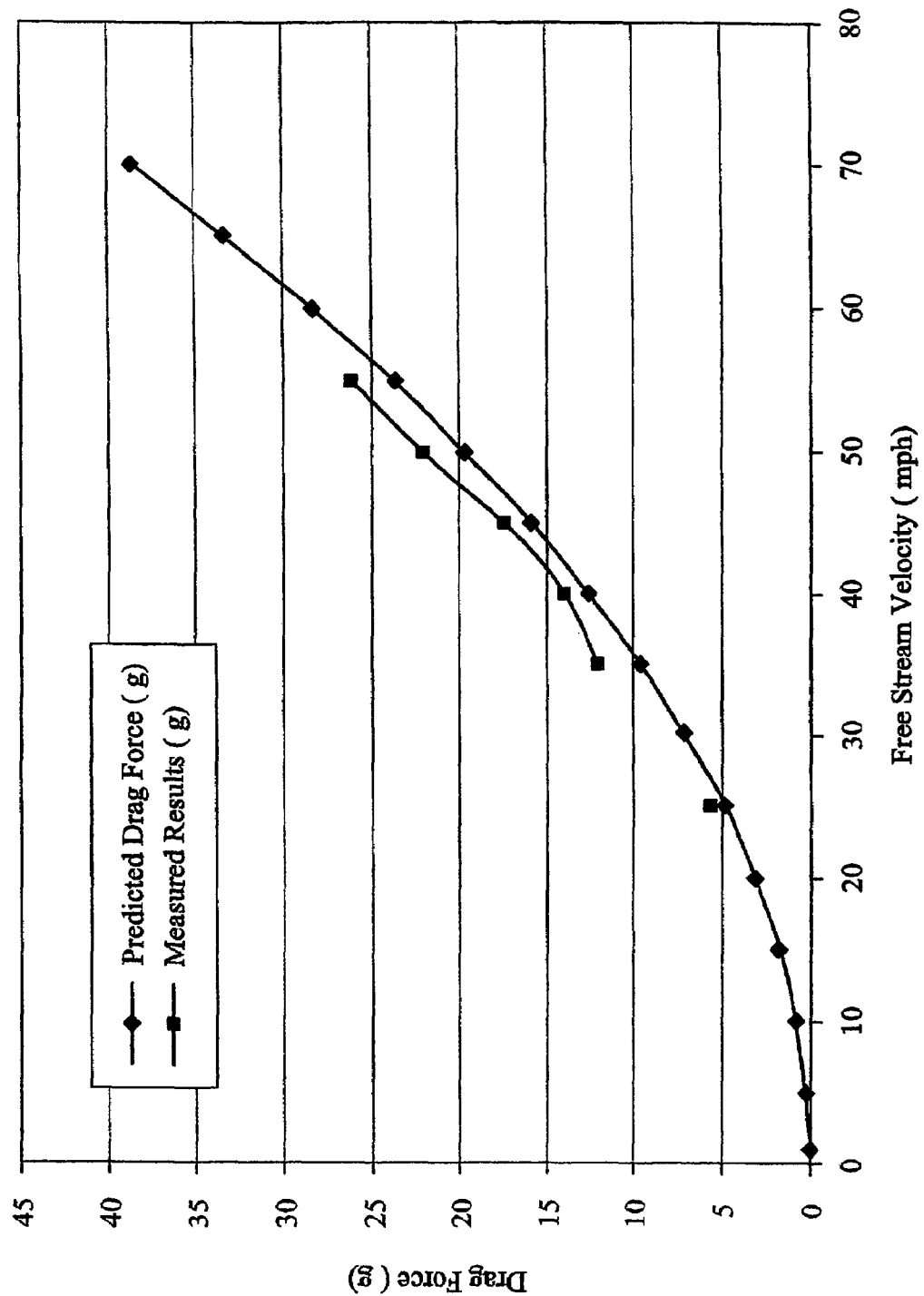
Figure 4:
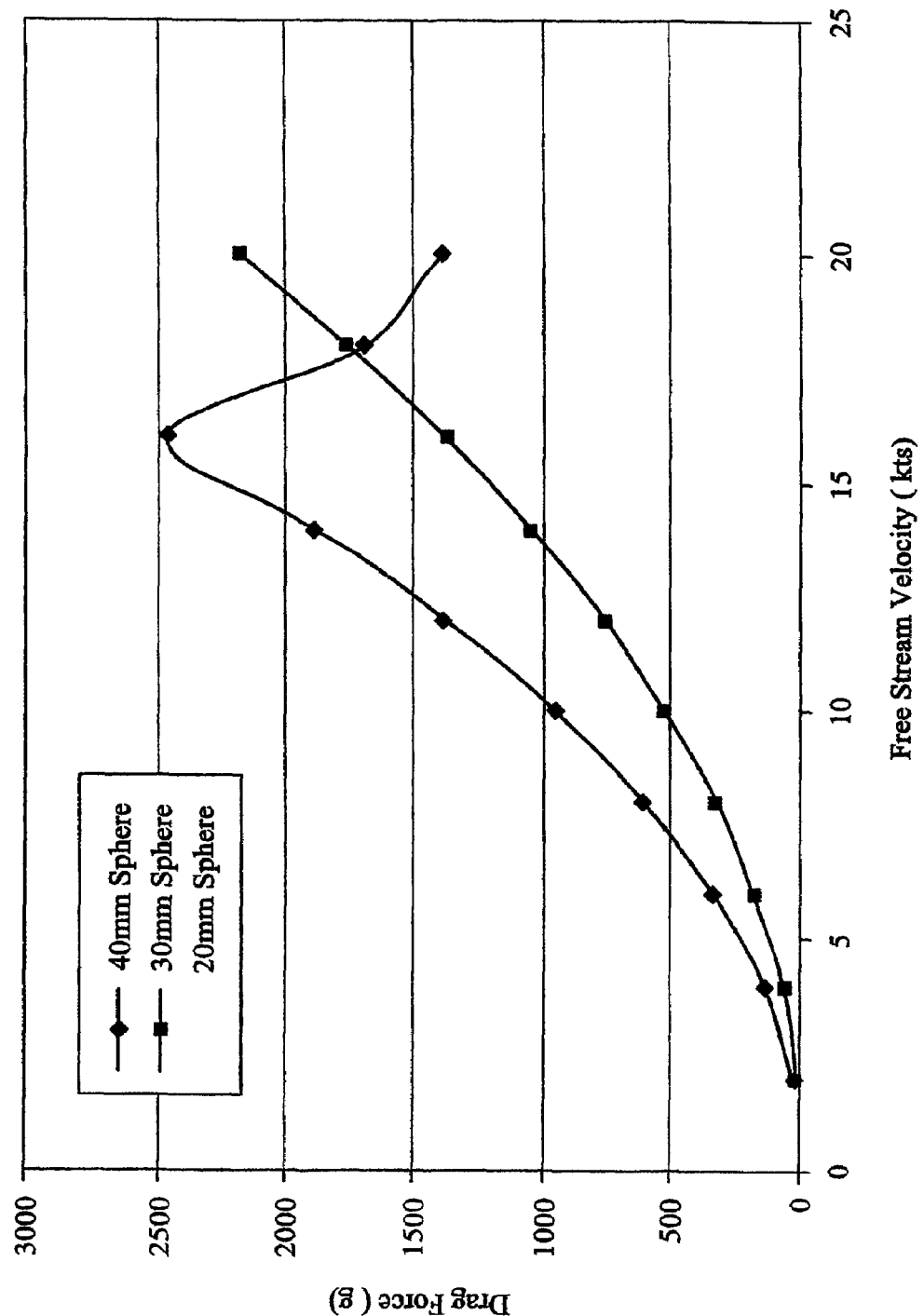
Figure 5:
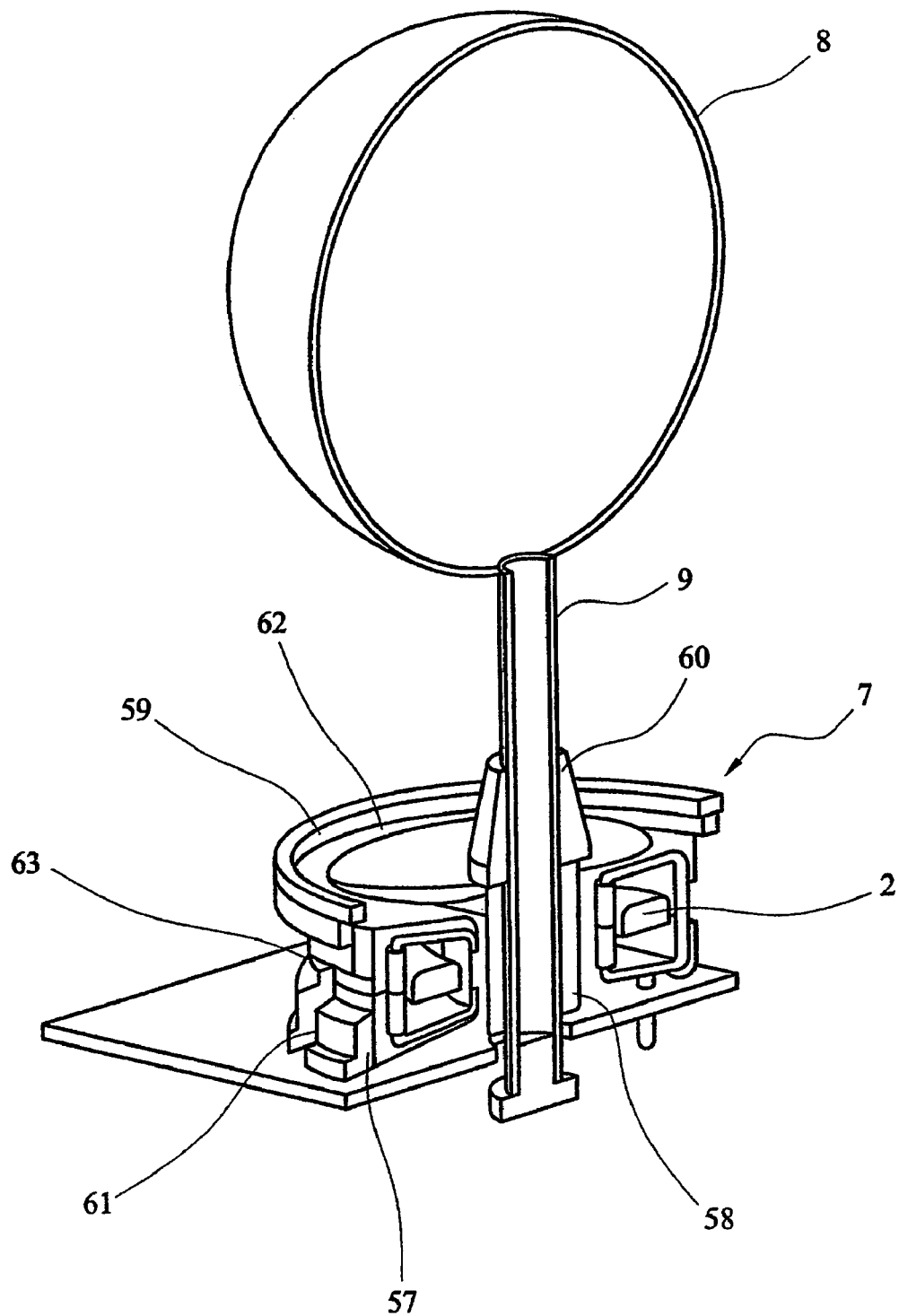

Exemplary embodiments of the invention will now be described in greater detail with reference to the drawings, in which FIG. 1 shows a fluxgate based device according to the invention FIG. 2 shows a transformer based device FIG. 3 shows an example of wind speed measurement FIG. 4 shows an example of water speed measurement FIG. 5 shows a cross-section of an alternative embodiment FIG. 1 shows a fluxgate based device with a ring fluxgate magnetometer 1 comprising a magnetic core 2, which core comprises an annular disc of magnetic material with peripheral grooves, 3,4 which are adapted to receive toroidal windings 5. A coiled spring 6 having four coils is mounted co-axially with the annular disc 2 on the disc. At the end of the spring 6 remote from the disc, a semi-rigid mount 7 having an opening is fixedly mounted in the last coil of the spring, so that it remains in a fixed position with respect to the last coil of the spring 6.

A sphere 8 is provided with a connecting rod 9, which passes through the opening in the mount 7. The end of the connecting rod 9 remote from the sphere rests in the opening on the annular disc 2. A conducting wire 10 is wound tightly around the connecting rod 9 forming a coil. The conducting wire 10 is attached to control electronics. The coiled spring 6, semi-rigid mount 7, sphere 8 and rod 9 form a deflection assembly. In use the magnetic core 2 and spring 6 will be enclosed within a housing to protect them from the effects of water and dirt ingress.

In a first embodiment a steady current is supplied to the conducting wire 10 so that a steady field is set up. In the absence of fluid motion there is no deflection of the sphere or deflection assembly and the steady field has no net component in either of the two directions of sensitivity of the fluxgate. When fluid causes a deflection by force against the spring the steady field is no longer symmetric and a net field is established in one or both of the fluxgate's sensitive axes such that the output of the fluxgate coils 5 give the two orthogonal components of the amount of such asymmetry and hence the direction and strength of fluid flow can be determined.

When the current in the coil is turned off then the fluxgate measures only fields that are not caused by the coil on the deflection assembly—such as that field due to the magnetic field of the earth. Such measurement either allows the elimination of an appearance of deflection due to such other fields or, in addition, can be used to determined the direction of the earth's field. When such a determination has been made the direction of the deflection can be related to the direction of the earth's field.

In an alternative embodiment, the conducting wire 10 is replaced by a permanent magnet, which can also form the connecting rod 9, in which case the windings 5 of the fluxgate device will measure the net field due to the field caused by the permanent magnet. When there is no deflection the field due to the permanent magnet is symmetrical about the sense coils of the fluxgate and no motion is sensed. When a drag-force causes a deflection of the assembly, the net field is no longer zero and increases with deflection in a direction which can be related to the direction of the motion of the fluid and by an amount which can be related to the speed of the fluid.

In such an arrangement the fluxgate could additionally be shielded by magnetic material so that the influence of other fields can be reduced. Also or alternatively the magnet can be powerful so as reduce the significance of other fields—such as that of the earth.

In a further alternative embodiment based on a fluxgate, the coil formed by the conducting wire 10 is fixed in position with respect to the fluxgate. The connecting rod 9 is attached to the sphere 8 and is formed of a ferromagnetic material such as ferrite or steel. In use, a steady current is applied to the position fixed coil 10 so that when the current is established, the rod 9 functions as though it were a permanent magnet. The detection of movement is then as described above and it is again possible to reduce or exclude the effect of other fields such as the Earth's. This embodiment has the advantage that the wire 10 does not need to flex in use.

FIG. 2 shows a transformer based device, which shares a number of structural features with the fluxgate based device. The device comprises a magnetic core 20 having first 24 and second (not shown) orthogonal coils or windings. A coiled spring is mounted co-planarly with the magnetic core 20. At the end of the spring 6 remote from the disc, a semi-rigid mount 7 having an opening is fixedly mounted in the last coil of the spring, so that it remains in a fixed position with respect to the last coil of the spring 6. A sphere 8 is provided with a connecting rod 19, which passes through the opening in the mount 7. The end of the connecting rod 19 remote from the sphere rest in the opening on the annular disc 2. A conducting wire 10 is wound tightly around the connecting rod 19 to form a further coil. The coiled spring 6, semi-rigid mount 7, sphere 8 and rod 19 form a deflection assembly. The connecting rod may be made of a magnetic material so as to enhance or alter the field generated.

In use, an alternating electric current is applied to the conducting wire 10 so that an alternating magnetic field is established in the magnetic detection assembly comprising the core 20 and the first coil and second coils orthogonally arranged over the core. The core is arranged at an end of the deflection assembly such that the field of the coil 10 is at right angles to the plane of the core and the first and second coils. In such an arrangement with no drag-force there is no deflection and the orthogonality is undisturbed such that the field caused by the third coil 10 creates a net zero induced voltage in either of first or second coils. When a deflection occurs such field is offset such that there is a net voltage generated in the windings on the core such that the magnitude and phase of such induced voltage is a measure of the deflection in both magnitude and, by resolving the two magnitudes in coils 2 and 3, the direction. The output of the first and second coils is passed to control electronics which are adapted to determine and display fluid speed and direction. As with the fluxgate based device a housing can be provided to protect the core and windings from the effect of water ingress.

FIRST EXAMPLE

Wind Speed

In a first example of the device in which wind speed is measured, the sphere has a diameter of 40 mm and the core a diameter of 23 mm. The predicted and measured results are given in Table 1 below and the results shown in FIG. 2.

TABLE 1

| Free stream velocity (mph) | Free stream velocity (m/s) | Reynolds Number | Cd (from lookup table) | Drag Force (N) | Predicted Drag Force (g) | Measured results (g) |
| --- | --- | --- | --- | --- | --- | --- |
| 0 | 0.00 | 0.00E+00 | 0.5 | 0.0000 | | |
| 1 | 0.45 | 1.23E+03 | 0.5 | 0.0001 | 0.01 | |
| 5 | 2.24 | 6.15E+03 | 0.5 | 0.0019 | 0.20 | |
| 10 | 4.47 | 1.23E+04 | 0.5 | 0.0077 | 0.78 | |
| 15 | 6.71 | 1.84E+04 | 0.5 | 0.0173 | 1.77 | |
| 20 | 8.94 | 2.46E+04 | 0.5 | 0.0308 | 3.14 | |
| 25 | 11.18 | 3.07E+04 | 0.5 | 0.0481 | 4.90 | 5.6 |
| 30 | 13.41 | 3.69E+04 | 0.5 | 0.0693 | 7.06 | |
| 35 | 15.65 | 4.30E+04 | 0.5 | 0.0943 | 9.61 | 12 |
| 40 | 17.88 | 4.92E+04 | 0.5 | 0.1231 | 12.55 | 14 |
| 45 | 20.12 | 5.53E+04 | 0.5 | 0.1558 | 15.89 | 17.5 |
| 50 | 22.35 | 6.15E+04 | 0.5 | 0.1924 | 19.61 | 22 |
| 55 | 24.59 | 6.76E+04 | 0.5 | 0.2328 | 23.73 | 26 |
| 60 | 26.82 | 7.38E+04 | 0.5 | 0.2770 | 28.24 | |
| 65 | 29.06 | 7.99E+04 | 0.5 | 0.3251 | 33.14 | |
| 70 | 31.29 | 8.61E+04 | 0.5 | 0.3771 | 38.44 | |

SECOND EXAMPLE

Water Speed

In a second example, in which water speed is measure, the sphere has a diameter of 40 mm and the core a diameter of 23 mm. The predicted and measured results are given in Table 2 below and the results shown in FIG. 3.

TABLE 2

| Free stream velocity (knots) | Free stream velocity (m/s) | Reynolds Number | Cd (from lookup table) | Drag Force (N) | Drag Force (g) |
|---|---|---|---|---|---|
| 0 | 0 | 0.00E+00 |  | 0.0000 |  |
| 2 | 1.028 | 4.24E+04 | 0.5 | 0.3420 | 35 |
| 4 | 2.056 | 8.47E+04 | 0.5 | 1.3678 | 139 |
| 6 | 3.084 | 1.27E+05 | 0.55 | 3.3854 | 345 |
| 8 | 4.112 | 1.69E+05 | 0.55 | 6.0185 | 614 |
| 10 | 5.14 | 2.12E+05 | 0.55 | 9.4039 | 959 |
| 12 | 6.168 | 2.54E+05 | 0.55 | 13.5416 | 1380 |
| 14 | 7.196 | 2.96E+05 | 0.55 | 18.4316 | 1879 |
| 16 | 8.224 | 3.39E+05 | 0.55 | 24.0739 | 2454 |
| 18 | 9.252 | 3.81E+05 | 0.3 | 16.6192 | 1694 |
| 20 | 10.28 | 4.24E+05 | 0.2 | 13.6783 | 1394 |

THIRD EXAMPLE

Water Speed

In a third example, in which water speed is measure, the sphere has a diameter of 30 mm and the core a diameter of 23 mm. The predicted and measured results are given in Table 3 below and the results shown in FIG. 3.

TABLE 3

| Free stream velocity (knots) | Free stream velocity (m/s) | Reynolds Number | Cd (from lookup table) | Drag Force (N) | Drag Force (g) |
|---|---|---|---|---|---|
| 0 | 0 | 0.00E+00 |  | 0.0000 |  |
| 2 | 1.028 | 3.18E+04 | 0.5 | 0.1924 | 20 |
| 4 | 2.056 | 6.35E+04 | 0.5 | 0.7694 | 78 |
| 6 | 3.084 | 9.53E+04 | 0.55 | 1.9043 | 194 |
| 8 | 4.112 | 1.27E+05 | 0.55 | 3.3854 | 345 |
| 10 | 5.14 | 1.59E+05 | 0.55 | 5.2897 | 539 |
| 12 | 6.168 | 1.91E+05 | 0.55 | 7.6171 | 776 |
| 14 | 7.196 | 2.22E+05 | 0.55 | 10.3678 | 1057 |
| 16 | 8.224 | 2.54E+05 | 0.55 | 13.5416 | 1380 |
| 18 | 9.252 | 2.86E+05 | 0.55 | 17.1385 | 1747 |
| 20 | 10.28 | 3.18E+05 | 0.55 | 21.1587 | 2157 |

FOURTH EXAMPLE

Water Speed

In a fourth example, in which water speed is measure, the sphere has a diameter of 20 mm and the core a diameter of 23 mm. The predicted and measured results are given in Table 4 below and the results shown in FIG. 3.

TABLE 4

| Free stream velocity (knots) | Free stream velocity (m/s) | Reynolds Number | Cd (from lookup table) | Drag Force (N) | Drag Force (g) |
|---|---|---|---|---|---|
| 0 | 0 | 0.00E+00 |  | 0.0000 |  |
| 2 | 1.028 | 2.12E+04 | 0.45 | 0.0769 | 8 |

TABLE 4-continued

| Free stream velocity (knots) | Free stream velocity (m/s) | Reynolds Number | Cd (from lookup table) | Drag Force (N) | Drag Force (g) |
|---|---|---|---|---|---|
| 4 | 2.056 | 4.24E+04 | 0.5 | 0.3420 | 35 |
| 6 | 3.084 | 6.35E+04 | 0.5 | 0.7694 | 78 |
| 8 | 4.112 | 8.47E+04 | 1 | 1.5046 | 153 |
| 10 | 5.14 | 1.06E+05 | 0.55 | 2.3510 | 240 |
| 12 | 6.168 | 1.27E+05 | 0.55 | 3.3854 | 345 |
| 14 | 7.196 | 1.48E+05 | 0.55 | 4.6079 | 470 |
| 16 | 8.224 | 1.69E+05 | 0.55 | 6.0185 | 614 |
| 18 | 9.252 | 1.91E+05 | 0.55 | 7.6171 | 776 |
| 20 | 10.28 | 2.12E+05 | 0.55 | 9.4039 | 959 |

As can be seen from the examples and FIGS. 2 and 3, the device of the invention provides an accurate measurement of both wind and water speed in addition to be being able to determine direction.

FIG. 5 shows in cross section an alternative embodiment based on a floating core fluxgate device. As with the previous embodiments, a sphere 8 is provided with a connecting rod 9, which passes through the opening in the mount 7. The mount 7 comprises a fluxgate device, comprising an annular magnetic core 2 held within an annular housing 57. A cradle 58 is provided in the cylindrical opening of housing 57, which cradle is adapted to receive the connecting rod 9. A flat spring 59 is then mounted on the upper side of the housing 57 with the connecting rod 9 acting on the flat spring 59. The core 2 thus resiliently engages with the connecting rod 9 via the flat spring 59 such that movement of the connecting rod 9 against the bias of the spring 59 causes a corresponding movement of the core 2. A support 60 is provided which facilitates the clamping of the flat spring 59, cradle 58 and housing 57 to a printed circuit board for the resolution of the fluxgate signals.

The housing 57 is provided with first and second orthogonal toroidal windings 61, 62 and a further circumferential toroidal winding 63 is provided. The toroidal windings 61, 62 function in the same manner as the coils 5 and 24 described in further detail with respect to FIGS. 1 and 2 above. The further circumferential toroidal winding enables the field measured by the fluxgate device to be fixed to the device rather than to the Earth. Thus when the device is tilted the field is tilted too. In this way, the floating core instead of eliminating the effect of tilt, causes only tilt to be sensed because the position of the core is kept in the same plane as the surface of the earth, by gravity. In the invention the core is fixed to the earth but the field is fixed to the device. This is done in such a way that it would be regarded as having no horizontal component—only a vertical component; furthermore, vertical in this meaning is vertical to the device and fixed to it rather than with respect to the Earth.

Therefore in use, the core is again arranged at an end of the deflection assembly such that the field of the circumferential winding 62 is at right angles to the plane of the core and the first and second coils. In such an arrangement with no drag-force there is no deflection and the orthogonality is undisturbed such that the field caused by the winding 62 creates a net zero induced voltage in either of first or second windings 60, 61. When a deflection occurs the field is offset such that there is a net voltage generated in the windings 60, 61 on the core such that the magnitude and phase of such induced voltage is a measure of the deflection in both magnitude and, by resolving the two magnitudes in windings 60 and 61 the direction. The output of the first and second coils is passed to control electronics which are adapted to determine and display fluid speed and direction.

Although the device has been specifically described as measuring wind or water speed and direction, it would of course be possible to measure other fluid flow and direction as long as the device were calibrated appropriately. Although the deflection means has been described as a sphere or spheroid, it would be possible to use other geometries having a high number of axes of symmetry. For the fluxgate devices, the fluxgate component will typically be a ring fluxgate but it would be possible to use other fluxgate arrangements.

The invention claimed is:

1. A device for measuring fluid flow and direction comprising magnetic measurement means having a core and first and second orthogonal windings arranged over the core, and deflector means adapted to be deflected in use by a fluid flow, the deflector means comprising a deflectable element resiliently connected to further magnetic field means, the deflector means being deflectably mounted with respect to the magnetic measurement means, the deflector means, which provides an output, the magnitude of which output corresponds to the magnitude of deflection of the deflector means, wherein the output is resolvable in two orthogonal axes such that a value for fluid flow direction can be determined.

2. A device for measuring fluid flow and direction according to claim 1, wherein the magnetic field means comprises an annular core, which core is resiliently connected to the deflectable element.

3. A device for measuring fluid flow and direction according to claim 1, wherein the further magnetic field means comprises at least one of a permanent magnet, a third winding, or an electromagnet, the axis of each of which is orthogonal to the first and second windings when the deflectable element is in an undeflected position.

4. A device for measuring fluid flow and direction according to claim 3, wherein, in use, an alternating current is supplied to the third winding so that an alternating magnetic field is established in the magnetic measurement means, such that a deflection of the deflector means induces voltages in the first and second windings, the magnitude and phase of the voltage providing a measure of fluid flow and direction.

5. A device for measuring fluid flow and direction according to claim 3, wherein the deflector means comprises a rod of a ferromagnetic material and the further magnetic means comprises a third winding, which third winding is position fixed with respect to the first and second windings, wherein, in use, a steady current is applied to the third winding, which current induces a magnetic field in said rod.

6. A device for measuring fluid flow and direction according to claim 1, wherein the magnetic measurement means comprises a ring fluxgate magnetometer.

7. A device for measuring fluid flow and direction according to claim 1, wherein the deflector means is supported by a spring, which spring is resiliently mounted on or connected to the magnetic core.

8. A device for measuring fluid flow and direction according to claim 1, wherein the deflector means includes a connecting rod.

9. A device for measuring fluid flow and direction according to claim 8, wherein the rod is of a magnetic material so as to enhance or alter a generated field.

10. A device for measuring fluid flow and direction according to claim 8, wherein the connecting rod is resiliently held in a mount, which mount is rigidly connected to the spring.

11. A device for measuring fluid flow and direction according to claim 1, wherein the deflectable element is spheroid, in particular a sphere.

12. A device for measuring fluid flow and direction according to claim 2, wherein the further magnetic field means comprises at least one of a permanent magnet, a third winding, or an electromagnet, the axis of each of which is orthogonal to the first and second windings when the deflectable element is in an undeflected position.

13. A device for measuring fluid flow and direction according to claim 12, wherein, in use, an alternating current is supplied to the third winding so that an alternating magnetic field is established in the magnetic measurement means, such that a deflection of the deflector means induces voltages in the first and second windings, the magnitude and phase of the voltage providing a measure of fluid flow and direction.

14. A device for measuring fluid flow and direction according to claim 12, wherein the deflector means comprises a rod of a ferromagnetic material and the further magnetic means comprises a third winding, which third winding is position fixed with respect to the first and second windings, wherein, in use, a steady current is applied to the third winding, which current induces a magnetic field in said rod.

15. A device for measuring fluid flow and direction according to claim 2, wherein the magnetic measurement means comprises a ring fluxgate magnetometer.

16. A device for measuring fluid flow and direction according to claim 3, wherein the magnetic measurement means comprises a ring fluxgate magnetometer.

17. A device for measuring fluid flow and direction according to claim 2, wherein the deflector means is supported by a spring, which spring is resiliently mounted on or connected to the magnetic core.

18. A device for measuring fluid flow and direction according to claim 3, wherein the deflector means is supported by a spring, which spring is resiliently mounted on or connected to the magnetic core.

19. A device for measuring fluid flow and direction according to claim 12, wherein the deflector means is supported by a spring, which spring is resiliently mounted on or connected to the magnetic core.

20. A device for measuring fluid flow and direction according to claim 4, wherein the deflector means is supported by a spring, which spring is resiliently mounted on or connected to the magnetic core.

21. A device for measuring fluid flow and direction according to claim 13, wherein the deflector means is supported by a spring, which spring is resiliently mounted on or connected to the magnetic core.

22. A device for measuring fluid flow and direction according to claim 5, wherein the deflector means is supported by a spring, which spring is resiliently mounted on or connected to the magnetic core.

23. A device for measuring fluid flow and direction according to claim 14, wherein the deflector means is supported by a spring, which spring is resiliently mounted on or connected to the magnetic core.

24. A device for measuring fluid flow and direction according to claim 6, wherein the deflector means is supported by a spring, which spring is resiliently mounted on or connected to the magnetic core.

25. A device for measuring fluid flow and direction according to claim 15, wherein the deflector means is supported by a spring, which spring is resiliently mounted on or connected to the magnetic core.

26. A device for measuring fluid flow and direction according to claim 16, wherein the deflector means is supported by a spring, which spring is resiliently mounted on or connected to the magnetic core.

27. A device for measuring fluid flow and direction according to claim 2, wherein the deflector means includes a connecting rod.

28. A device for measuring fluid flow and direction according to claim 3, wherein the deflector means includes a connecting rod.

29. A device for measuring fluid flow and direction according to claim 4, wherein the deflector means includes a connecting rod.

30. A device for measuring fluid flow and direction according to claim 5, wherein the deflector means includes a connecting rod.

31. A device for measuring fluid flow and direction according to claim 6, wherein the deflector means includes a connecting rod.

32. A device for measuring fluid flow and direction according to claim 7, wherein the deflector means includes a connecting rod.

33. A device for measuring fluid flow and direction according to claim 8, wherein the connecting rod is of a magnetic material so as to enhance or alter a generated field.

34. A device for measuring fluid flow and direction according to claim 8, wherein the connecting rod is of a magnetic material so as to enhance or alter a generated field.

35. A device for measuring fluid flow and direction according to claim 27, wherein the connecting rod is of a magnetic material so as to enhance or alter a generated field.

36. A device for measuring fluid flow and direction according to claim 28, wherein the connecting rod is of a magnetic material so as to enhance or alter a generated field.

37. A device for measuring fluid flow and direction according to claim 29, wherein the connecting rod is of a magnetic material so as to enhance or alter a generated field.

38. A device for measuring fluid flow and direction according to claim 30, wherein the connecting rod is of a magnetic material so as to enhance or alter a generated field.

39. A device for measuring fluid flow and direction according to claim 31, wherein the connecting rod is of a magnetic material so as to enhance or alter a generated field.

40. A device for measuring fluid flow and direction according to claim 32, wherein the connecting rod is of a magnetic material so as to enhance or alter a generated field.

41. A device for measuring fluid flow and direction according to claim 8, wherein the connecting rod is resiliently held in a mount, which mount is rigidly connected to the spring.

42. A device for measuring fluid flow and direction according to claim 27, wherein the connecting rod is resiliently held in a mount, which mount is rigidly connected to the spring.

43. A device for measuring fluid flow and direction according to claim 28, wherein the connecting rod is resiliently held in a mount, which mount is rigidly connected to the spring.

44. A device for measuring fluid flow and direction according to claim 29, wherein the connecting rod is resiliently held in a mount, which mount is rigidly connected to the spring.

45. A device for measuring fluid flow and direction according to claim 30, wherein the connecting rod is resiliently held in a mount, which mount is rigidly connected to the spring.

46. A device for measuring fluid flow and direction according to claim 31, wherein the connecting rod is resiliently held in a mount, which mount is rigidly connected to the spring.

47. A device for measuring fluid flow and direction according to claim 32, wherein the connecting rod is resiliently held in a mount, which mount is rigidly connected to the spring.

48. A device for measuring fluid flow and direction according to claim 2, wherein the deflectable element is a spheroid, in particular a sphere.

49. A device for measuring fluid flow and direction according to claim 3, wherein the deflectable element is a spheroid, in particular a sphere.

50. A device for measuring fluid flow and direction according to claim 4, wherein the deflectable element is a spheroid, in particular a sphere.

51. A device for measuring fluid flow and direction according to claim 5, wherein the deflectable element is a spheroid, in particular a sphere.

52. A device for measuring fluid flow and direction according to claim 6, wherein the deflectable element is a spheroid, in particular a sphere.

53. A device for measuring fluid flow and direction according to claim 7, wherein the deflectable element is a spheroid, in particular a sphere.

54. A device for measuring fluid flow and direction according to claim 8, wherein the deflectable element is a spheroid, in particular a sphere.

55. A device for measuring fluid flow and direction according to claim 9, wherein the deflectable element is a spheroid, in particular a sphere.

56. A device for measuring fluid flow and direction according to claim 10, wherein the deflectable element is a spheroid, in particular a sphere.

* * * * *